3,178,483
PROCESS FOR PREPARING VINYL AND 1,1-DIFLUOROETHANE

Frank Joseph Christoph, Jr., Elkton, Md., and Gunter Teufer, Chadds Ford, Pa., assignors to E. I. du Pont de Nemours and Company, Wilmington, Del., a corporation of Delaware
No Drawing. Filed Nov. 8, 1962, Ser. No. 236,404
3 Claims. (Cl. 260—653.4)

The present invention is directed to a process for reacting acetylene with hydrogen fluoride in the vapor phase and in the presence of a novel aluminum fluoride catalyst to form vinyl fluoride and 1,1-difluoroethane.

Aluminum fluoride has, of course, been known for many years. Unlike many other compounds however, the aluminum fluoride known to the art has only one crystalline form. This form is a relatively poor catalyst for the reaction of hydrogen fluoride with acetylene for a number of reasons.

There are several catalysts known for the vapor phase reaction of acetylene with hydrogen fluoride besides the known aluminum fluoride, for example aluminum oxide, aluminum sulfate and the life. All of the known solid catalysts have the distinct disadvantages of either causing poor conversions at reasonable feed rates or rather high yields of tars and other by-products.

It is, therefore, an object of the present invention to provide a new process for the vapor phase reaction of hydrogen fluoride with acetylene to form vinyl fluoride and 1,1-difluoroethane.

It is a second object of this invention to provide a new and novel catalyst for the vapor phase reaction of hydrogen fluoride with acetylene to form vinyl fluoride and 1,1-difluoroethane.

These and other objects will become apparent from the following description and claims.

More specifically, the present invention is directed to a process for preparing vinyl fluoride and 1,1-difluoroethane which process comprises passing a mixture of hydrogen fluoride and acetylene in a molar ratio of from about one to about five moles of hydrogen fluoride per mole of acetylene over $\beta$-aluminum fluoride catalyst at from about 250° to about 400° C., at a feed rate of from about 10 to about 4000 milliliters of acetylene at standard conditions per gram of catalyst per hour and a pressure of from about 0.1 to about 4 atmospheres and recovering vinyl fluoride and 1,1-difluoroethane from the reaction mixture, said $\beta$-aluminum fluoride catalyst being prepared by dehydrating $\alpha$-aluminum fluoride trihydrate at from about 150° to about 450° C. until water ceases to be evolved.

$\beta$-aluminum fluoride is a new, previously undescribed crystalline form of aluminum fluoride. The well known, high temperature stable form of aluminum fluoride is called herein the $\alpha$-form by analogy with the various crystalline forms of alumina. The new $\beta$-form of aluminum fluoride is different from the $\alpha$-form and the two are readily distinguished by X-ray analysis of the crystals. The X-ray diffraction pattern of $\alpha$-aluminum fluoride is given on ASTM Card 9–138. It belongs to space group $D_3^7$–R32, has unit cell parameters $a=4.927$ A. and $c=12.445$ A., a unit cell volume of 2615 A.$^3$, contains six molecules of aluminum fluoride per unit cell and has a calculated density of 3.197 g./cc. The new $\beta$-form of aluminum fluoride belongs to space group $D_{6h}^4$–P6/mmc., has unit cell parameters $a=6.93$ A. and $c=7.125$ A., a unit cell volume of 2964 A.$^3$ and has a calculated density of 2.815 g./cc.

The spacings and intensities of the X-ray diffraction pattern of $\beta$-aluminum fluoride are given in Table I.

TABLE I.—SPACINGS AND INTENSITIES OF $\beta$-AlF$_3$

| d(A.) | Intensity | (hkl) |
|---|---|---|
| 6.002 | vst | (100) |
| 3.563 | vst | (002) |
| 3.465 | st | (110) |
| 3.063 | w | (102) |
| 3.001 | st | (200) |
| 2.484 | w | (112) |
| 2.295 | w | (202) |
| 2.266 | w | (210) |
| 2.209 | w | (103) |
| 2.161 | w | (211) |
| 2.001 | m | (300) |
| 1.914 | m | (212) |
| 1.782 | mst | (004) |
| 1.732 | mst | (220) |
| 1.708 | mw | (104) |
| 1.665 | m | (310) |
| 1.585 | mw | (114) |
| 1.558 | mw | (222) |
| 1.532 | m | (204) |
| 1.500 | m | (400) |
| 1.377 | mw | (320) |
| 1.330 | w | (304) |
| 1.310 | vw | (410) |
| 1.284 | w | (322) |
| 1.242 | w | (224) |
| 1.216 | w | (314) |
| 1.200 | vw | (500) |
| 1.188 | vw | (006) |
| 1.148 | mw | (404) |
| 1.134 | w | (420) | v=very, w=weak, m=medium, st=strong.

The only known way for preparing catalytically active $\beta$-aluminum fluoride consists in dehydrating $\alpha$-aluminum fluoride trihydrate at 150–450° C. At least 150° C. is preferred to decompose the hydrate. Temperatures above 600° C. cause the formation of major amounts of $\alpha$-aluminum fluoride, which being less catalytically active is undesired. At temperatures above 500° C. $\alpha$-aluminum fluoride begins to form part of the catalyst. Care should be taken that $\alpha$-aluminum fluoride trihydrate is not converted to the $\beta$-form during precipitation or the resulting $\beta$-aluminum fluoride will not be pure, although the impure form is a useful catalyst and is not excluded from use herein.

$\alpha$-Aluminum fluoride trihydrate is prepared by the method described by Ehret and Frere in J. Amer. Chem. Soc., 67, 64 (1945). More specifically, alumina or aluminum is dissolved in hydrofluoric acid near 10–15° C. and a hydrate precipitates. This hydrate, AlF$_3$·9H$_2$O loses water on standing in air to form $\alpha$-AlF$_3$·3H$_2$O. $\alpha$-Aluminum fluoride trihydrate is easily characterized by its X-ray diffraction pattern which also distinguishes it from $\beta$-aluminum fluoride trihydrate. The $\alpha$-hydrate belongs to space group $D_{3d}^5$-R$\bar{3}$m, has unit cell parameters $a=9.272$ A. and $c=4.647$ A. and contains three molecules per unit cell. Its X-ray diffraction pattern is given in Table II. The X-ray diffraction pattern of the $\beta$-trihydrate is given on ASTM Card 9–108.

TABLE II.—SPACING AND INTENSITIES OF
α-AlF$_3$·3H$_2$O

| d$_c$(A) | Relative Intensities[1] | (hkl) |
|---|---|---|
| 4.637 | 100 | (110) |
| 4.046 | 46 | (101) |
| 3.048 | 1 | (201) |
| 2.676 | 4 | (300) |
| 2.547 | 36 | (211) |
| 2.318 | 2 | (200) |
| 2.248 | 7 | (102) |
| 2.023 | 5 | (202) |
| 2.011 | 5 | (311) |
| 1.854 | 22 | (212) |
| 1.845 | 22 | (401) |
| 1.752 | 2 | (410) |
| 1.714 | 6 | (321) |
| 1.614 | 11 | (312) |
| 1.561 | <<1 | (003) |
| 1.546 | <1 | (330) |
| 1.524 | 2 | (402) |
| 1.519 | 2 | (501) |
| 1.480 | <1 | (113) |
| 1.448 | 4 | (322) |
| 1.444 | 4 | (421) |
| 1.378 | 1 | (511) |
| 1.349 | 3 | (303) |
| 1.338 | 3 | (600) |
| 1.295 | 1 | (223) |
| 1.286 | 3 | (520) |
| 1.274 | <1 | (422) |
| 1.270 | <1 | (431) |
| 1.186 | 2 | (104) |
| 1.166 | 1 | (413) |
| 1.159 | 3 | (440) |

[1] Based on the 4.637 A. line having an intensity of 100.

In the present process β-aluminum fluoride in any suitable form such as powder, pellets or the like, is placed in a reactor fitted with means for contacting gases with solids. The reactor and catalyst are heated to the desired reaction temperature and a mixture of anhydrous hydrogen fluoride and acetylene is passed over the catalyst. The product issuing from the reactor consists of a mixture of hydrogen fluoride, acetylene, vinyl fluoride and 1,1-difluoroethane, and, on occasions, a number of trace by-products. This mixture is separated into its constituent parts by any convenient means. Distillation is one such means; hydrogen fluoride (B.P. 19.4° C.) is easily separated from acetylene (B.P. —84° C.), vinyl fluoride (B.P. —72° C.) and 1,1-difluorethane (B.P. —24° C.) and the organic materials are easily separated from each other by properly designed distillation equipment under pressure. Alternate methods, known to the art, exist for separating the reaction products. The hydrogen fluoride and acetylene recovered may be recycled if desired.

The reaction is carried out at from about 250° to about 400° C. At temperatures below about 250° C. the reaction is too slow to be useful commercially. At temperatures above about 400° C., by-product formation becomes increasingly rapid. Above 500° C. the catalyst is slowly converted to the less active α-form and this is to be avoided. Although the active beta-form can be converted to the less active α-form by heating, there is no way known for converting the less active α-form back to the more active beta-form. Thus, once the catalyst is overheated and loses its activity, the activity can not be regained.

The mole ratio of hydrogen fluoride to acetylene may vary from about one to about five. When the ratio is much below one the conversion of acetylene is undesirably low, resulting in excessively large amounts of acetylene which must be removed or recovered and recycled. Of course, some vinyl fluoride and 1,1-difluoroethane are formed but the process is commercially unattractive. The increasing amounts of hydrogen fluoride resulting from mole ratios much above five have little practical effect on conversion of acetylene to products. The larger amounts of hydrogen fluoride also result in larger recovery and recycle streams with no practical advantage. Since hydrogen fluoride is not monomeric in the vapor phase below about 60° C., the mole ratio can not be determined from volume ratios unless the molecular weight of hydrogen fluoride vapor is taken into account. The mole ratio is best calculated from the weight of hydrogen fluoride fed per unit time. It is naturally understood that the mole ratio is for moles of monomolecular hydrogen fluoride per mole of acetylene.

Reaction pressures of from 0.1 to 4 atmospheres may be used. Generally it is preferred to operate at one atmosphere or above due to the increased difficulties of operating at subatmospheric pressure.

The feed rates of acetylene, using the mole ratios of reactants described above, may be varied from about 10 to about 4000 milliliters of acetylene per gram of catalyst per hour. The volume of acetylene indicated is determined at 25° C. and one atmosphere pressure regardless of the reaction temperature and pressure used. The weight of the catalyst is based on the beta-aluminum fluoride used, excluding the weight of binders and the like which may be used to prepare pellets or similar forms. Contact times or residence times vary with feed rate, temperature and pressure.

Since it is well known that determination of gas temperature in flow systems is subject to many errors and the calculation of contact times to many others, it is preferred to define the present process on the basis of the readily determined feed rates defined above which are not subject to these undetermined errors.

It has been found that increasing the reaction pressure above one atmosphere, keeping feed rate, mole ratios and temperatures constant, increases the conversion of acetylene to products. The relative yield of 1,1-difluoroethane compared to vinyl fluoride is not materially affected by a pressure increase. Hence, there is an economic advantage gained in higher conversions and productivity and smaller recycle streams by operating at superatmospheric pressures.

The preferred conditions of the present process are 300–350° C., 1.3 moles of hydrogen fluoride per mole of acetylene and 25–45 p.s.i.g. pressure. Acetylene feed rates of less than 400 ml./gr. of catalyst/hr. are preferred. These preferred conditions lead to optimum yields of vinyl fluoride.

Vinyl fluoride is useful for preparing polymers, especially polyvinyl fluoride, a commercial product. 1,1-difluoroethane is useful as a refrigerant, propellent and as an intermediate for preparing chlorodifluoroethane (U.S. 2,899,472), vinylidene fluoride (U.S. 2,551,573) and other valuable products (U.S. 2,417,059; 2,549,767; 2,469,290). 1,1-difluoroethane may also be converted to vinyl fluoride by any of several known processes if desired (U.S. 2,599,631; 2,674,632).

The reactor and other equipment must be resistant to the action of hydrogen fluoride. If dry, steel may be used although it is preferred to use stainless steel, nickel or the high nickel alloys such as "Inconel" or "Monel" metals. The reactor may be heated in any manner known to the art which allows sufficient temperature control such as electric heaters, molten salts baths and the like. The starting materials should be reasonably anhydrous. Commercial anhydrous hydrogen fluoride contains slight traces of water which may be tolerated. Acetylene often contains acetone and other impurities, especially when it is stored in cylinders in acetone solution. Methods for removing acetone and other impurities and for drying acetylene are well known to the art. One such method is described in U.S. 2,716,142, col. 3, line 72 to col. 4, line 5. The acetylene used in the examples which follow was purified in a manner similar to that described in U.S. 2,716,142.

Representative examples illustrating the present invention follow.

*Example I.—Preparation of catalyst*

A mixture of 660 g. of distilled water and 550 g. of 48% hydrofluoric acid was prepared in a polyethylene beaker and the solution was cooled to 5° C. Then 312 g. of hydrated alumina (C-33 grade from Alcoa) was added in small portions to the acid solution, maintaining the temperature during the addition below 10° C. When the alumina addition was complete, the mass was agitated overnight in an ice-bath. The precipitate which formed was collected on a chilled filter and the solids were washed with cold water. After air drying, the solids were dried at 100° C. for four hours and finally in a muffle furnace at 400° C. for four hours. The product was identified as β-aluminum fluoride by its X-ray diffraction pattern.

Examples II–V

A vertically mounted, tubular stainless steel reactor of one inch (inside diameter) was fitted for admitting gaseous acetylene and hydrogen fluoride at the bottom and allowing products to be removed from the top. β-Aluminum fluoride prepared in Example I (61 g.) was placed in the reactor to form a bed 14 inches deep. The reactor was immersed in a molten salt bath, swept with nitrogen, and mixtures of acetylene and hydrogen fluoride were fed into the system at atmospheric pressure under the conditions shown below. The results are also shown below.

CONDITIONS

| Example | Mole ratio, $HF/C_2H_2$ | Temperature, ° C. | Acetylene feed rate, ml./g. catalyst/hr. |
|---|---|---|---|
| II | 2.4 | 315 | 148.8 |
| III | 2.4 | 315 | 89.7 |
| IV | 2.24 | 350 | 172.5 |
| V | 1.3 | 350 | 163.4 |

RESULTS

| Example | II | III | IV | V |
|---|---|---|---|---|
| Mole, percent products: | | | | |
| Vinyl fluoride | 81.0 | 72.3 | 64 | 81 |
| 1,1-difluoroethane | 5.5 | 18.0 | 35 | 17 |
| Acetylene | 10.3 | 7.9 | 1.3 | 2 |
| Propylene | 0.3 | 0.1 | | |
| Ethane | 0.1 | 0.01 | | |
| Ethylene | 2.9 | 1.6 | | |
| Percent conversion | 90.0 | 92.2 | 98.1 | 98.0 |
| Percent yield (based on acetylene converted): | | | | |
| Vinyl fluoride | 86.6 | 76.9 | 64.8 | 82.7 |
| 1,1-difluoroethane | 5.9 | 19.2 | 35.2 | 17.3 |

Examples VI–X

In order to illustrate the surprising results obtained using β-aluminum fluoride as a catalyst over the previously known α-aluminum fluoride, the following examples were carried out in the apparatus described above. α-Aluminum fluoride (209.7 g.), used as a granulated material obtained by crushing pellets obtained from Harshaw Chemical Co., was placed in the reactor. The reactor was then heated in the molten salt bath as before and mixtures of anhydrous hydrogen fluoride and acetylene were passed into the reactor at atmospheric pressure. The reaction conditions used and the results obtained are given below.

CONDITIONS

| Example | Mole ratio, $HF/C_2H_2$ | Temperature, ° C. | Acetylene feed rate, ml./g. catalyst/hr. |
|---|---|---|---|
| VI | 2.4 | 315 | 26.1 |
| VII | 2.4 | 315 | 30.0 |
| VIII | 2.4 | 315 | 43.8 |
| IX | 1.3 | 320 | 53.5 |
| X | 1.3 | 346 | 38.8 |

RESULTS

| Example | VI | VII | VIII | IX | X |
|---|---|---|---|---|---|
| Mole percent products: | | | | | |
| Vinyl fluoride | 28.0 | 39.8 | 34.1 | 42.0 | 52.0 |
| 1,1-difluoroethane | 21.4 | 22.1 | 17.5 | 13.8 | 10.7 |
| Acetylene | 49.9 | 36.8 | 47.6 | 40.5 | 34.8 |
| Propane | 0.01 | 0.01 | 0.01 | 0.01 | 0.01 |
| Ethylene | 0.8 | 0.6 | 0.4 | 1.7 | 3.8 |
| Ethane | 0.01 | 0.1 | 0.06 | 0.03 | 0.08 |
| Percent conversion | 50.1 | 63.2 | 52.4 | 59.5 | 65.2 |
| Percent yield (based on acetylene converted): | | | | | |
| Vinyl fluoride | 55.4 | 63.0 | 65.0 | 70.6 | 79.8 |
| 1,1-difluoroethane | 42.7 | 35.0 | 33.5 | 23.2 | 16.4 |

The reaction conditions selected for Examples VI–X represent nearly optimum yield conditions using α-aluminum fluoride catalyst at reasonable conversion rates.

It is readily apparent from comparing Examples II–V with Examples VI–X that the α-form of aluminum fluoride is a much less active catalyst than the new β-form of aluminum fluoride. The known α-form causes conversions of acetylene 30–50% lower at feed rates which are 2–3 times slower. Higher feed rates with higher conversion are naturally desirable because they increase the production rates and reduce the opportunity for the formation of by-products. Both α- and β-aluminum fluorides may be prepared by dehydration of α-aluminum fluoride trihydrate, the only difference being the temperature to which the trihydrate is heated. Hence it can be stated that the new β-form is inherently at least 2–3 times more active than the known α-aluminum fluoride. This is an entirely unexpected and surprising result.

Example XI

Using the equipment and catalyst of Examples II–V, a reaction was carried out at 330° C., using a HF/acetylene mole ratio of 1.3/1, a feed rate of 398 ml. reactants (at 25° C. and one atmosphere)/gram catalyst/hr. and a reaction pressure of 25 p.s.i.g. The results are shown below.

RESULTS

Mole percent products:
Vinyl fluoride _____ 80.1
1,1-difluoroethane _____ 8.0
Acetylene _____ 13.6
Ethylene _____ 2.6
Butylene _____ 0.04
Propylene _____ 0.2
Ethane _____ 0.1
Others _____ 0.3
Percent conversion _____ 87.4
Percent yield:
Vinyl fluoride _____ 84.7
1,1-difluoroethane _____ 8.5
By-products _____ 3.1

Example XII

Powdered β-aluminum fluoride (6.0 g.) was placed in a 0.9 x 20.3 cm. tubular reactor fitted in the same manner as the previous examples. Acetylene and hydrogen fluoride were passed into the reactor which was heated at 325° C. The mole ratio of HF to acetylene was 1.3 and the feed rate of acetylene was 3000 ml. (at standard conditions)/gram catalyst/hr. The reaction pressure was 30 p.s.i.g. The product was recovered as before. The results are shown below.

RESULTS

Mole percent product:
Vinyl fluoride _____ 74.0
1,1-difluoroethane _____ 25.0
Acetylene _____ 1.0
Percent conversion _____ 99.0
Percent yield:
Vinyl fluoride _____ 74.5
1,1-difluoroethane _____ 25.5

It is understood that the preceeding examples are representative and that said examples may be varied within the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing vinyl fluoride and 1,1-difluoroethane which process comprises passing a mixture of hydrogen fluoride and acetylene at a temperature of from about 250° C. to about 400° C. and at a pressure of from about 0.1 to about 4 atmospheres over β-aluminum fluoride catalyst, said catalyst obtained by dehydrating α-aluminum fluoride trihydrate at from about 150° C. to about 450° C. until water ceases to be evolved therefrom, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters, measured at standard conditions, per gram of catalyst per hour, and recovering from said reaction mixture vinyl fluoride and 1,1-difluoroethane.

2. A process for preparing vinyl fluoride and 1,1-difluoroethane which process comprises passing a mixture of hydrogen fluoride and acetylene at a temperature of from 300° to 350° C. and at a pressure of from 25–45 p.s.i.g. over β-aluminum fluoride catalyst, said catalyst obtained by dehydrating α-aluminum fluoride trihydrate at from about 150° to about 450° C. until water ceases to be evolved therefrom, said mixture of hydrogen fluoride and acetylene having a molar ratio of 1.3 moles of hydrogen fluoride per mole of acetylene, the feed rate of acetylene in said mixture being from about 10 to about 400 milliliters, measured at standard conditions, per gram of catalyst per hour, and recovering from said reaction mixture vinyl fluoride and 1,1-difluoroethane.

3. A process for preparing β-aluminum fluoride catalyst, which process comprises dehydrating α-aluminum fluoride trihydrate at from about 150° C. to about 450° C. until water ceases to be evolved therefrom.

References Cited by the Examiner

UNITED STATES PATENTS

| | | | |
|---|---|---|---|
| 2,471,525 | 5/49 | Hillyer et al. | 260—653.6 |
| 2,755,313 | 7/56 | Calfee et al. | 260—653.6 |

LEON ZITVER, *Primary Examiner.*

DANIEL D. HORWITZ, *Examiner.*